US011027994B2

(12) United States Patent
Jasim et al.

(10) Patent No.: US 11,027,994 B2
(45) Date of Patent: Jun. 8, 2021

(54) SYSTEM AND METHOD FOR ADVANCED OXIDATION OF TREATED SEWAGE EFFLUENT

(71) Applicant: QATAR FOUNDATION FOR EDUCATION, SCIENCE AND COMMUNITY DEVELOPMENT, Washington, DC (US)

(72) Inventors: Saad Y. Jasim, Doha (QA); Jayaprakash Saththasivam, Doha (QA); Kavithaa Loganathan, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 123 days.

(21) Appl. No.: 16/310,682

(22) PCT Filed: Jun. 19, 2017

(86) PCT No.: PCT/US2017/038155
§ 371 (c)(1),
(2) Date: Dec. 17, 2018

(87) PCT Pub. No.: WO2017/219028
PCT Pub. Date: Dec. 21, 2017

(65) Prior Publication Data
US 2019/0248681 A1    Aug. 15, 2019

Related U.S. Application Data

(60) Provisional application No. 62/351,900, filed on Jun. 17, 2016.

(51) Int. Cl.
*C02F 1/00* (2006.01)
*C02F 1/44* (2006.01)
(Continued)

(52) U.S. Cl.
CPC ............... *C02F 1/52* (2013.01); *C02F 1/444* (2013.01); *C02F 1/722* (2013.01); *C02F 1/78* (2013.01);
(Continued)

(58) Field of Classification Search
CPC .... C02F 1/52; C02F 1/444; C02F 1/78; C02F 1/001; C02F 1/40; C02F 1/66; C02F 1/72; C02F 9/00; C02F 1/722
See application file for complete search history.

(56) References Cited

U.S. PATENT DOCUMENTS 5,364,529 A    11/1994 Morin et al.
6,090,294 A    7/2000 Teran et al.
(Continued)

FOREIGN PATENT DOCUMENTS

CN    101700944 A      5/2010
CN    103193335 A  *   7/2013
(Continued)

OTHER PUBLICATIONS

Machine Translation, CN 103193335. Jul. 14, 2020.*
(Continued)

*Primary Examiner* — Benjamin L Lebron
(74) *Attorney, Agent, or Firm* — Nath, Goldberg & Meyer; Richard C. Litman

(57) ABSTRACT

A system and method for advanced oxidation (10) of treated sewage effluent provide additional treatment to treated sewage effluent (TSE) for reuse thereof. The method includes exposing TSE to ozone and hydrogen peroxide to oxidize contaminants; coagulating remaining waste in the TSE; flocculating the coagulated TSE; holding the flocculated treated sewage effluent in a settling tank for sedimentation; removing coarse suspended particles from the flocculated TSE by filtration after sedimentation; and removing fine
(Continued)

suspended particles by ultrafiltration of the TSE after removing the coarse suspended particles. The system includes a chemical mixing tank (16); a homogenizing tank (22); an advanced oxidation process system (24); a rapid mixer; a flocculation tank (28); a sedimentation tank (32); a sand filter (34); and at least one ultrafiltration system (38), (36).

2 Claims, 9 Drawing Sheets

(51) Int. Cl.
    *C02F 1/52* (2006.01)
    *C02F 1/72* (2006.01)
    *C02F 1/78* (2006.01)
    *C02F 9/00* (2006.01)
    *C02F 1/40* (2006.01)
    *C02F 1/66* (2006.01)

(52) U.S. Cl.
    CPC ............... *C02F 9/00* (2013.01); *C02F 1/001* (2013.01); *C02F 1/40* (2013.01); *C02F 1/66* (2013.01); *C02F 1/72* (2013.01)

(56) References Cited

U.S. PATENT DOCUMENTS

| | | |
|---|---|---|
| 6,365,048 B1 | 4/2002 | Masten et al. |
| 8,071,055 B2 | 12/2011 | Newcombe |
| 9,067,807 B2 | 6/2015 | Soane et al. |
| 2002/0148790 A1 | 10/2002 | Krulik |
| 2003/0024879 A1 | 2/2003 | Carson et al. |
| 2004/0031762 A1* | 2/2004 | Ried ............... C02F 1/78 210/748.11 |
| 2010/0155328 A1* | 6/2010 | O'Regan, Jr. ........... C02F 3/006 210/614 |
| 2010/0155330 A1 | 6/2010 | Burba et al. |
| 2011/0163045 A1 | 7/2011 | Mamane et al. |
| 2012/0261347 A1 | 10/2012 | Hassler et al. |
| 2013/0134053 A1 | 5/2013 | Musson |
| 2013/0313191 A1 | 11/2013 | Wolf et al. |
| 2015/0166383 A1 | 6/2015 | Visnja et al. |
| 2015/0218011 A1 | 8/2015 | Zhu et al. |
| 2016/0068417 A1 | 3/2016 | Buschmann |

FOREIGN PATENT DOCUMENTS

| | | |
|---|---|---|
| CN | 103787525 A | 5/2014 |
| DE | 10144510 A1 | 3/2003 |
| KR | 20020004661 A | 1/2002 |

OTHER PUBLICATIONS

Cruden, Alex, "Coagulation and Flocculation in Water and Wastewater Treatment", IWA Water Wiki (2015), 16 pages.

Keisuke Ikehata et al., "Ozonation and Advanced Oxidation Treatment of Emerging Organic Pollutants in Water and Wastewater," Ozone: Science and Engineering 30(1): pp. 21-26 (2008).

Extended European Search Report for EPO App. No. 17814262.6, dated Jan. 7, 2020.

\* cited by examiner

Antibiotics in TSE

| Compound | Molecular Structure | MW (g/mol) |
|---|---|---|
| Chlorotetracycline Hydrochloride (CTC) |  | 515.34 |
| Enrofloxacin (ENR) |  | 359.4 |

Target Compounds in TSE

| Compound (CAS #) | Use/ Therapeutic Class | MW[1,2] | Structure |
|---|---|---|---|
| Atrazine (ATZ) (1912-24-9) | Herbicides | 215.7 | |
| Bisphenol-A (BPA) (80-05-7) | Plasticizer | 228.3 | |
| Carbamazepine (CBZ) (298-46-4) | Anti-depressant | 236.1 | |
| Flouxetine (FLX) (54910-89-3) | Anti-depressant | 309.1 | |
| Diclofenac (DIC) (15307-86-5) | Analgesics | 294.0 | |
| Ibuprofen (IBU) (15687-27-1) | Analgesics | 206.3 | |
| Naproxen (NAP) (22204-53-1) | Analgesics | 230.1 | |
| Gemfibrozil (GEM) (25812-30-0) | Lipid Regulator | 250.4 | |
| Atrovastatin (ATV) (134523-00-5) | Lipid Regulator | 558.7 | |

FIG. 7

SYSTEM AND METHOD FOR ADVANCED OXIDATION OF TREATED SEWAGE EFFLUENT

TECHNICAL FIELD

The present subject matter relates generally to the treatment and reuse of wastewater for various purposes. More specifically, the present subject matter is a system for improving the quality of treated sewage effluent (TSE) for reuse in the industrial and agricultural sectors and to meet specific water quality requirements for potable and non-potable applications.

BACKGROUND ART

It is anticipated that there will be an increase in the demand on desalinated water supply due to increase in urban population and expansion of industrial and agricultural activities. This is expected to cause water shortages and a serious need for new water sources, especially as freshwater resources are depleted.

For instance, Qatar's only natural freshwater resources are precipitation and groundwater. In the years 2008-2012, the total precipitation (monitored at Doha International Airport) was lower than the long-term average precipitation (1962-1992). In the year 2012, the total precipitation was 32% of the long term average. According to the Environment Statistics Annual Report 2013 by the Ministry of Development Planning and Statistics State of Qatar, the exploitable groundwater volume is 47.5 million $m^3$ per year. However, since the current groundwater abstractions are about 250 million $m^3$ per year, this would lead to aquifers depletion and an increase in salinity. The depletion of its groundwater aquifers represents one of the major challenges for water systems management in Qatar.

Water scarcity is an issue that plagues other countries in the Middle East and North Africa (MENA) region, where it has been reported that more than two-thirds of the world's top 20 water-deficit countries are located. Another source revealed that at least 12 countries in the Arab and Western Asia region have less than 500 $m^3$ per capita per year of renewable water resources. Droogers et al, projected that water shortage in MENA region would increase approximately by 290% in 2041-2050 compared to actual shortage of 42,000 million $m^3$ per year in 2001-2010.

By taking into account the average detrimental effect of climate change, it was predicted that MENA's water discrepancy would be approximately four folds or higher in 2041-2050. Increases in annual water demand by 2050 according to different MENA countries and sectors are shown in FIGS. 2 and 3, respectively. It is evident from FIG. 3 and numerous publications that the agricultural sector is and will be the largest water consumer for the next few decades.

In comparison to global water usage of 70% for agricultural purposes, some of the countries in MENA region, especially Iran, Yemen, and Sudan are consuming over 90% of its total water withdrawal for agricultural activities. Despite its relatively lower demand in comparison to agriculture sector, water demand for urban and industry sectors are expected to surge to 88,000 million $m^3$ per year and 41,000 million $m^3$ year, respectively, by 2050.

In 2011, the total water use in the State of Qatar was 693.5 million $m^3$, excluding 32.9 million $m^3$ losses from the public water supply network. Private households were the largest water users with 295.6 million $m^3$, followed by agriculture use with 271.4 million $m^3$, and government use with 75.7 million $m^3$, Commercial activities used 29.1 million $m^3$ and industries 21.7 million $m^3$. For agriculture use, the main sources were groundwater (229.5 million $m^3$=85%) and TSE (42.0 million $m^3$=15%).

Presently, water demand in MENA region has already exceeded its natural water supply by 20% where this shortage is currently being met using groundwater reserves and desalinated water. It is indisputable that limited ground water resources and high desalination cost would not be able to sufficiently address the water shortage in this region.

A more sustainable and reliable water resource is required to satisfy the ever-growing demand in irrigation, urban and industrial activities that are further exacerbated by climate change and increase of population.

DISCLOSURE OF INVENTION

The present subject matter is directed to a system and method for advanced oxidation of treated sewage effluent (TSE). The system and method for the oxidation of treated sewage effluent improves the quality of TSE for reuse in the industrial and agricultural sectors and to meet specific water quality requirements for potable and non-potable applications.

In particular, the method for post-treatment of treated sewage effluent can include exposing treated sewage effluent to ozone and hydrogen peroxide to oxidize contaminants therein; coagulating remaining waste in the treated sewage effluent; flocculating the coagulated treated sewage effluent; holding the flocculated treated sewage effluent in a settling tank for sedimentation to occur; removing coarse suspended particles from the flocculated treated sewage effluent by filtration after sedimentation; and removing fine suspended particles by ultrafiltration of the treated sewage effluent after removing the coarse suspended particles.

A system for post-treatment of treated sewage effluent can include:

(a) a preparation tank for receiving treated sewage effluent;

(b) an ozone injection system for adding ozone into an ozone contactor;

(c) a hydrogen peroxide dosing pump for adding hydrogen peroxide to the ozone contactor;

(d) a rapid mixer for mixing coagulants in the ozone-hydrogen peroxide-dosed treated sewage effluent;

(e) a flocculation tank for flocculating coagulated waste in the ozone-hydrogen peroxide-dosed treated sewage effluent;

(f) a sedimentation tank for settling suspended particles from the flocculated waste;

(g) a filter for filtering the settled suspended particles;

(h) an advanced oxidation process system for administration of ozone and hydrogen peroxide;

(i) an ultrafiltration system for ultrafiltration of the filtered treated sewage effluent; and a system of conduits connecting (a) through (i).

These and other features of the present subject matter will become readily apparent upon further review of the following specification and drawings.

BRIEF DESCRIPTION OF DRAWINGS

FIG. 7 shows target compounds in TSE according to Vieno et al., 2007 and Snyder et al., 2007, wherein CAS # is the chemical abstracts service number and MW is the molecular weight.

Similar reference characters denote corresponding features consistently throughout the attached drawings.

BEST MODES FOR CARRYING OUT THE INVENTION

Figure 1A:
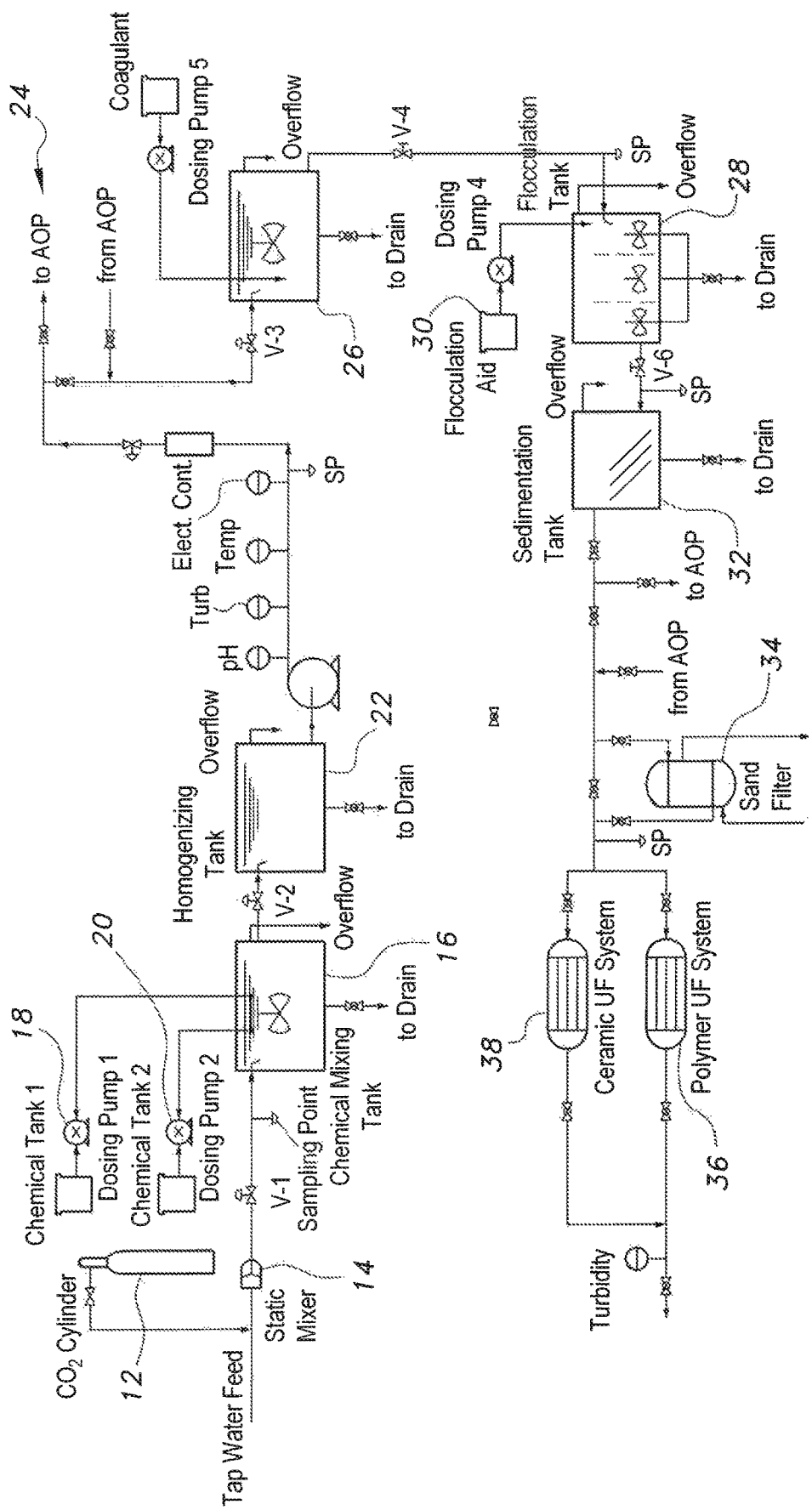
FIG. 1A provides a schematic of a pilot plant according to an embodiment of the present subject matter.

A system and method for oxidation of treated sewage effluent (TSF) can improve the quality of TSE for reuse in the industrial and agricultural sectors and to meet specific water quality requirements for potable and non-potable applications.

The present system can be in the form of a modular plant wherein treated sewage effluent is transferred to a preparation tank to ensure uniform dispersion of nutrients. An ozone and/or advanced oxidation process is introduced to oxidize micro pollutants and other contaminants, followed by coagulation and flocculation processes to remove suspended particles. Coagulation is achieved by rapid mixing and flocculation Coagulation can be performed in three (3) stages. Flocculated effluent is allowed to undergo a sedimentation process for a predetermined time. In the present method, a non-limiting time for sedimentation is 30 minutes, however other sedimentation times are contemplated. After the sedimentation process, the pretreated water is then passed into a filter to ensure removal of suspended particles. In a non-limiting example of the present apparatus, the filter is a sand filter. Following the filtration process, the water is treated by ultrafiltration (UF). Non-limiting examples of ultrafiltration include ceramic UF and/or polymer UF. The UF permeate is sent to an AOP system to oxidize organics, pathogens, and chemicals of emerging concern, odor, and color.

In the present subject matter, an ozone and ozone-hydrogen peroxide advanced oxidation process improves the quality of treated wastewater and provide new alternatives for treatment of wastewater for domestic, agricultural, and industrial applications. In particular, TSE reuse provides a significant water source for industrial applications such as district cooling and agriculture and would reduce the demand of desalinated water.

The present subject matter is directed to a system and method for oxidation of order to increase re-use quantities. The present subject matter is directed to a process involving the addition of ozone combined with hydrogen peroxide in order to dramatically reduce or eliminate pathogens and toxins that are not currently treated by existing purification technologies like chlorine and membrane filtration. The present subject matter addresses the critical need to evaluate the efficacy of applying certain advanced technologies to improve the quality of TSE and wastewater for reuse in more applications in the industrial and agriculture sectors to reduce the demand on desalinated water. TSE and wastewater have tremendous potential in supplementing the ever-growing water demand. Further, TSE and wastewater can be effectively recycled for both potable and non-potable purposes, provided the TSE and wastewater meet specific water quality requirements and type of application. Generation of treated wastewater is also cheaper and consumes lower energy when compared to desalinated water.

Wastewater effluent typically contains a wide range of pathogens and other pollutants including chemicals of emerging concerns and heavy metals, One aspect of the present subject matter is to provide an advanced treatment process to deliver a high quality of TSE. The system provides new options for using TSE to reduce demand on desalinated water, provides sustainability for the operation of district cooling systems, guidelines for water quality for the reuse of TSE, and a great potential for agriculture applications.

In the present subject matter, multi-stage treatments on TSE are provided to remove contaminants, including physical and chemical treatment, coagulation, sedimentation, sand filtration, pH adjustment, organic or ceramic membrane, ozone and single or multi stage pre-coagulation and/or post sedimentation, and ozone and hydrogen peroxide AOP.

In an embodiment of the present subject matter, TSE is transferred to a preparation tank to ensure uniform dispersion of flow and nutrients, Ozone is introduced in an AOP ($O_3+H_2O_2$) to oxidize micropollutants and other contaminants, such as pharmaceuticals, personal care products, and endocrine disrupting chemicals. Rapid mixing is followed by coagulation and flocculation, which is performed in three stages, to remove suspended particles. The flocculated effluent is then allowed to undergo sedimentation process for at least 30 minutes. After the sedimentation process, pretreated water is then passed into a sand filter to ensure removal of suspended particles. Following the sand filtration process, the proposed configuration allows treatment of the water using either ceramic ultrafiltration or polymer ultrafiltration. UF permeate is then sent to the AOP system to be used in the side stream injection for the ozone system. The Ozone/AOP oxidizes organics, pathogens, and chemicals of emerging concern, odor, and color.

Figure 1B:
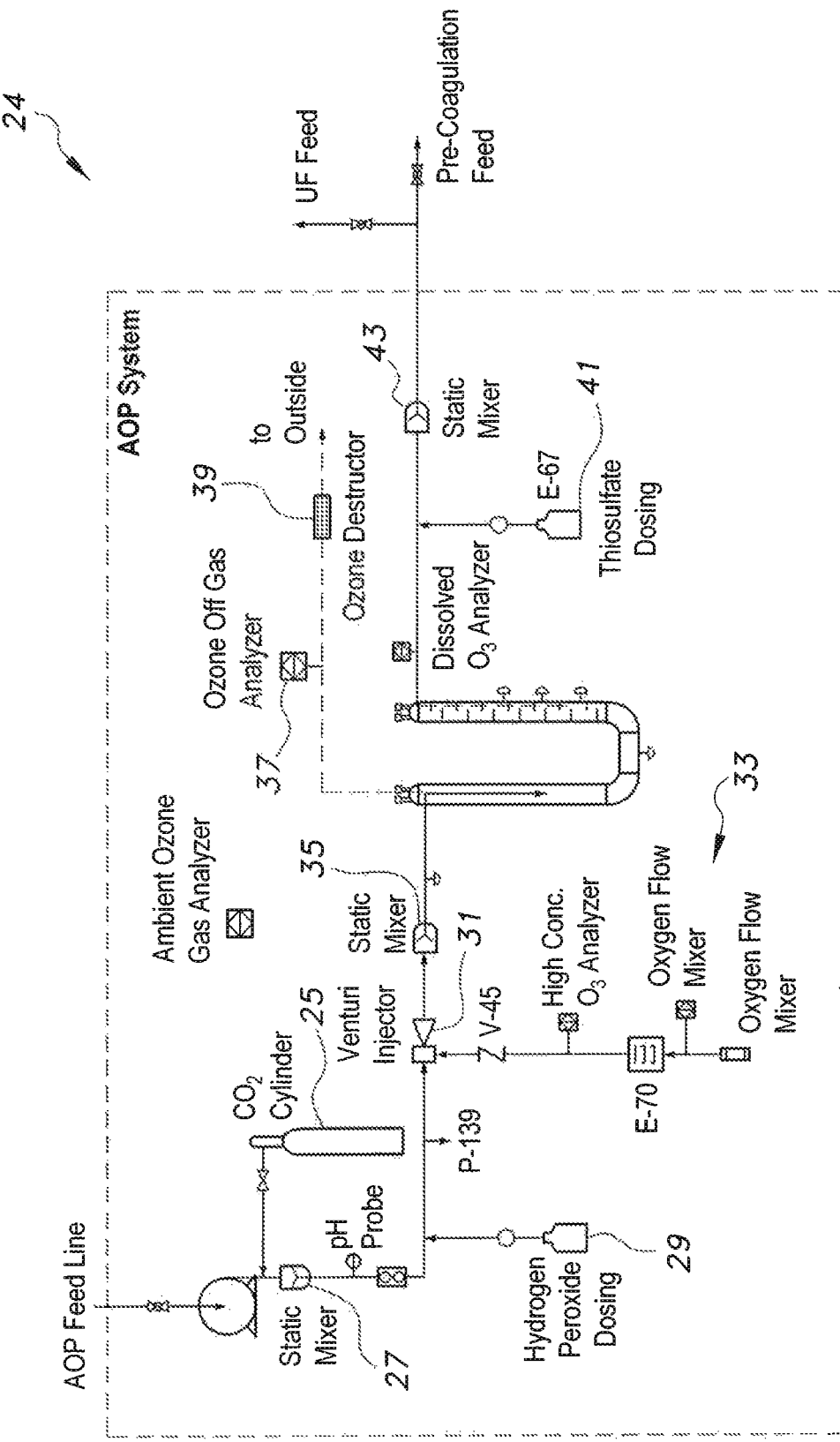
FIG. 1B provides a schematic of the advanced oxidation process (AOP) (ozone and hydrogen peroxide) system according to an embodiment of the present subject matter.
Figure 2:
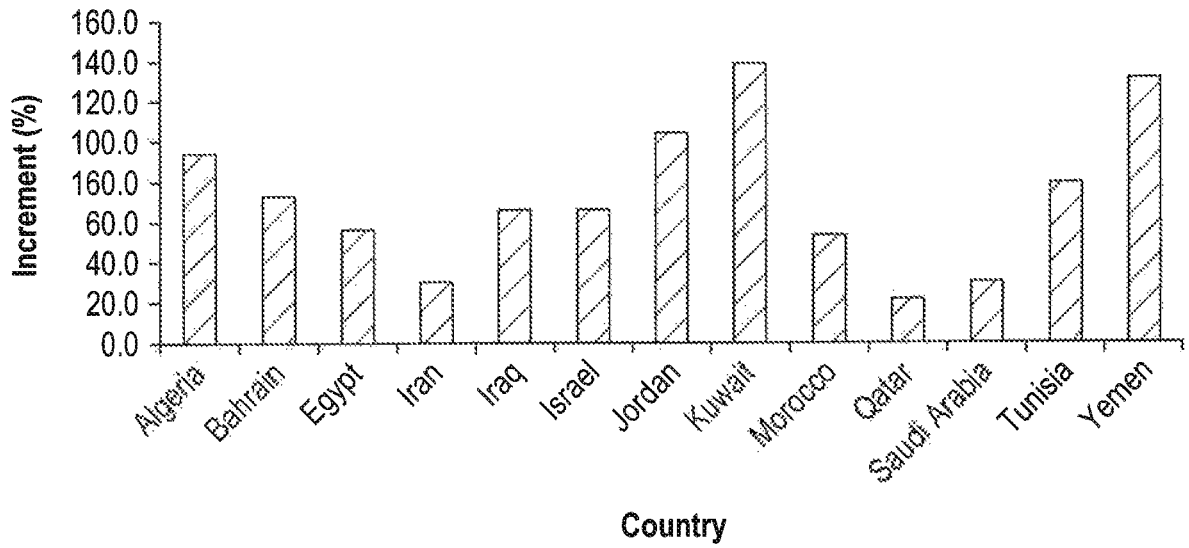
FIG. 2 shows the Predicted Increment of Annual Water Demand in the MENA Region by 2050.
Figure 3:
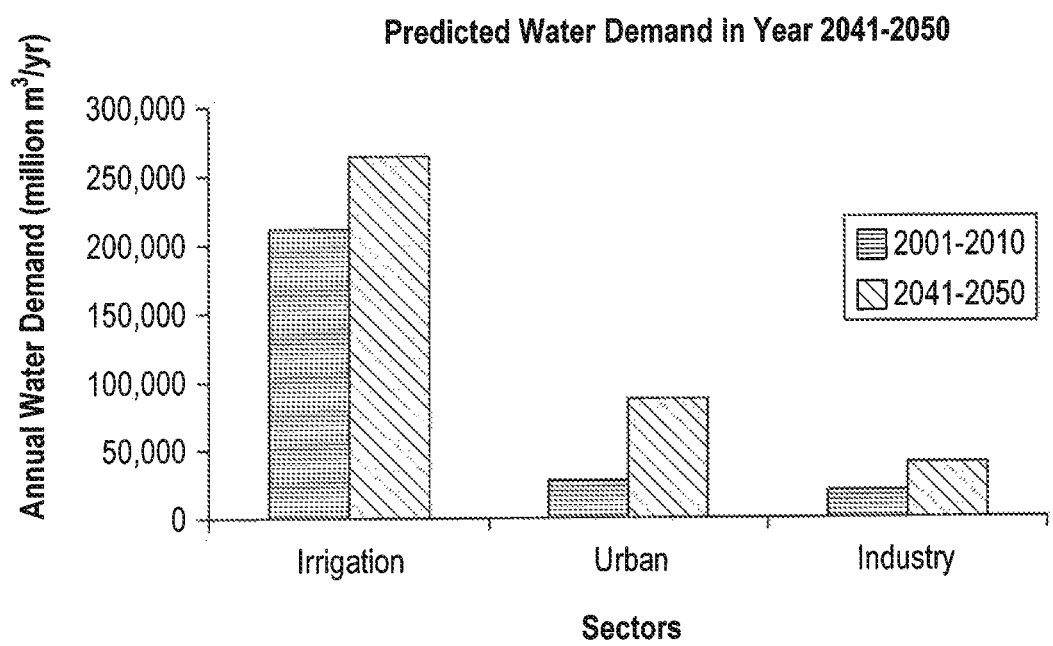
FIG. 3 shows the Predicted Increment of Annual Water Demand in the MENA Region by 2050.

FIG. 1A provides a schematic of a pilot plant according to an embodiment of the present subject matter. In an embodiment of the present subject matter, designated 10 in FIG. 1A, $CO_2$ may be introduced from a $CO_2$ cylinder into a treated wastewater (TSE) feed through a valve and sent to a static mixer 14, through a control valve, past a sampling point, and to a chemical mixing tank 16. A first chemical tank 18 may feed into the chemical mixing tank 16 through a first dosing pump, and a second chemical tank 20 may feed into the chemical mixing tank 16 through a second dosing pump. The chemical mixing tank 16 may have outputs including a drain, overflow, and an output to a control valve and on to a homogenizing tank 22. The homogenizing tank 22 may have outputs including a drain, overflow, and an output to a pump and on to an advanced oxidation process (AOP) system 24 (FIG. 1B). A sampling point and a series of valves may be present between the pump and the AOP system, and pH, turbidity, temperature, and electrical conductivity may optionally be tested. After going through the AOP system and through a valve, the flow may travel to a rapid mixer 26, and a coagulant may be input to the rapid mixer 26 through a third dosing pump. The rapid mixer 26 may have outputs including a drain, overflow, and an output to a flocculation tank 28 after passing through a control valve and sampling point. A flocculation aid 30 may be input to the flocculation tank 28 through a fourth dosing pump. The flocculation tank 28 may have outputs including a drain, overflow, and an output to a sedimentation tank 32 after passing through a control valve and sampling point. The sedimentation tank 32 may have outputs leading to a drain and through a series of valves leading to a sand filter 34, optionally through an AOP system 24. The sand filter 34 may have a reject output and a backwash line input. From the sand filter 34, the flow may leave through valves and a sampling point to a polymer UF system 36 or a ceramic UF system 38, through more valves and turbidity testing, and finally to an outlet.

In an embodiment of the present subject matter, such as according to FIG. 1B, the AOP feed line 24 may travel through a valve and a centrifugal pump, where $CO_2$ is introduced to the flow through a valve from a $CO_2$ cylinder 25. The flow may then travel through a static mixer 27 and a pH probe. The flow may then receive hydrogen peroxide dosing from a hydrogen peroxide source 29 through a peristaltic pump and travel through a sampling point to a Venturi injector 31. The Venturi injector 31 may be fed with ozone from an oxygen generator 33 through an oxygen flow meter, a batch tray dryer, an ozone generator, a high concentration ozone analyzer, and a valve. The Venturi injector 31 may output the flow to a static mixer 35. The ozone off gas passes through the off gas analyzer and the ozone destructor before being released outside. The water is analyzed for dissolved $O_3$ prior to receiving thiosulfate dosing from a thiosulfate source 41 through a pump. After thiosulfate dosing, the flow is directed to a static mixer 43. This flow may travel through valves to the UF feed 36, 38, or to the pre-coagulation feed which is directed to the rapid mixer 26.

A commercial application of the present subject matter may include combining the Advanced Oxidation Process with other technologies in a modular configuration. Such a configuration would be able to improve the treated sewage effluent quality to make it suitable for various water reuse applications.

A key competitive advantage of the present subject matter over existing systems in the present market is substantial removal of chemicals of emerging concern, which have a significant impact on the eco-system and human health. One competing product in the market of municipal wastewater treatment plants and related water reuse industry is ultraviolet disinfection. However, ultraviolet disinfection has a limited impact on the removal of compounds such as pharmaceuticals, personal care products, and endocrine disrupting chemicals and requires higher operational cost.

The methods and system of the present subject matter provide sustainable options for treating wastewater that normally would be discarded to provide a treated sewage effluent. The treated sewage effluent can be used in agricultural, commercial and consumer (potable) applications.

A Modular Pilot Plant according to the present subject matter was developed to investigate the reuse of TSE and agricultural wastewater for a wide range of applications by providing an additional treatment processes to deliver a high quality of TSE and agricultural wastewater. A pilot-scale unit according to the present subject matter built on a skid can have a nominal capacity of 0.5 m$^3$ per hour or 12 m$^3$ per day.

The Modular Pilot Plant constructed conducts applications for TSE and wastewater treatment to evaluate the applicability of new advanced technologies to resolve water treatment challenges addressing TSE water quality. The experimental work investigates the improvement and optimization of water treatment processes and applicability of advanced treatment technology.

The Modular Pilot Plant delivers an improved, high quality of water that can be used for irrigation, grey water application, district cooling, and other purposes, wherein the efficacy of Ozone and Ozone Based AOP in conjunction with other treatment processes was investigated for the reuse of TSE, industrial, and agriculture wastewater.

Bench Scale Experiments used Jar Testing for selection and optimization on chemicals used at CNAQ. Pilot Scale Experiments were conducted for implementation of advanced technologies and include membranes, ceramic UF and polymer UF systems, oxidation processes, ozone ($O_3$), and AOP ($O_3+H_2O_2$). This is in addition to coagulation, sedimentation, and pH control. The system was automated using SCADA to provide data collection, operation control, and reporting.

TSE and industrial wastewater could potentially play a significant role in supplementing the water demand of Arab countries as it has been reported that only 60% of the generated wastewater volume of 10,900 million in$^3$ per year was treated. Of this treated volume, only one third of the volume was actually reused. These figures clearly reveal that up to 80% of the total wastewater generated could potentially be reused to address the water shortage in the region.

Wastewater treatment is a fraction of the cost of desalination. TSE and wastewater have tremendous potential in supplementing the ever-growing water demand. TSE can be effectively recycled for both potable and non-potable purposes, provided it meets specific water quality requirements and type of application. Generation of treated wastewater is also cheaper and consumes lower energy when compared to desalinated water.

Due to global water scarcity, the reuse of treated wastewater has become a necessity and is widely recognized as a valuable water resource. Many countries have successfully recycled their wastewater resources to complement their overall water demand. For instance, Singapore is currently meeting 30% of its water need by reclaiming wastewater and aiming to increase the reuse rate to 55% by 2060. Bennett et al. also highlighted the wastewater reuse rate in Israel where over 80% of domestic household wastewater is recycled. To harness the benefits of reusing treated wastewater, the MENA countries have executed significant efforts and plans directed to treating wastewater for these purposes.

By 2040, Saudi Arabia has targeted an increase in their water-recycling rate by more than 90%. Water reuse in Saudi Arabia's agriculture sector is expected to increase by almost 1.3 fold in 2035 compared to the reported amount of 540 million m$^3$ per year in 2012. Similar increase is also predicted in the landscaping sector where the reuse amount in 2035 is approximated at 560 million m$^3$ per year. Apart from these two sectors, water reuse for other industrial sectors is predicted to constitute about 13% of overall water reuse of 2,130 million m$^3$ per year in 2035. Egypt's National Water Resources Plan is targeting to reuse 2400 million in$^3$ per year of the treated wastewater for agriculture irrigation to partially fulfill its anticipated total water requirement of more than 90,000 million in$^3$ by 2017, in Tunisia, long term goals were set to irrigate over 25,000 ha and recharge aquifers with 30 million m$^3$ of treated wastewater. In Abu Dhabi, its Environment Vision 2030 targets to recycle 100% of its treated wastewater by 2030.

Figure 4:
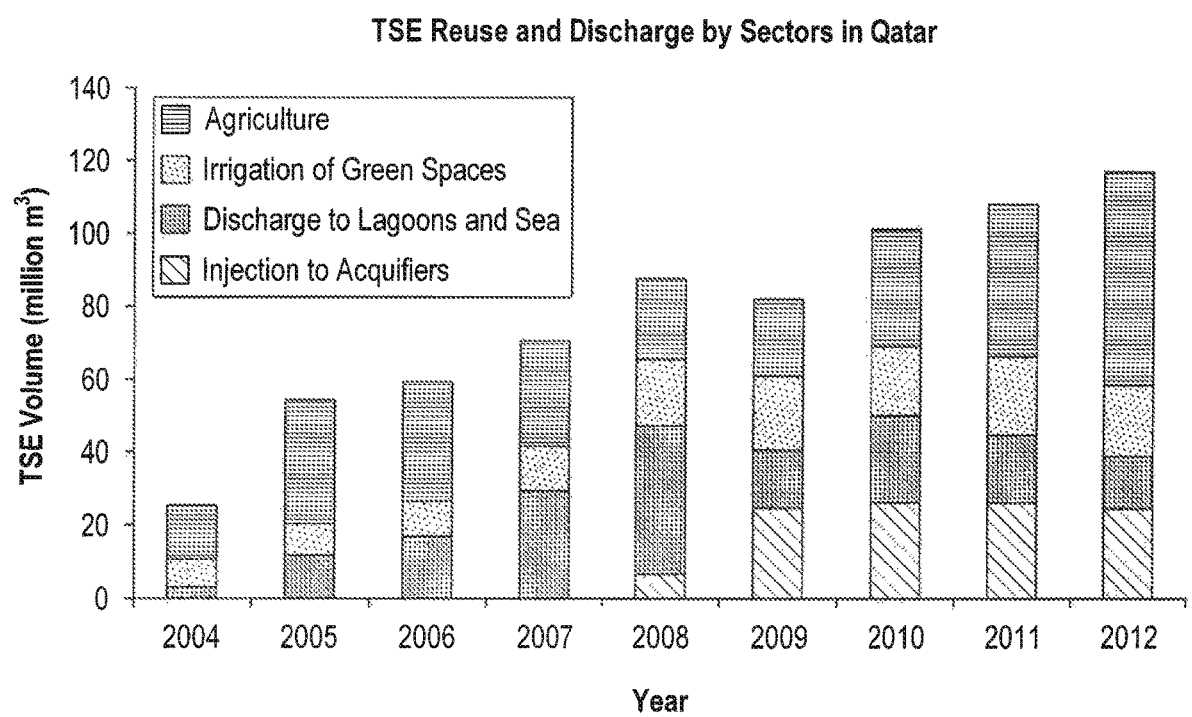
FIG. 4 shows TSE Reuse and Discharge by Sectors in Qatar.

Similarly, Qatar is making major headway in reusing its wastewater resources. Due to limited rainfall and depleting ground water sources, TSE has been recognized as one of the vital water resources that could play a key role in meeting Qatar's water demand. TSE generation in Qatar has augmented more than 3.4 times over the past seven years to 108 million $m^3$ in 2011. This constitutes 14% of 771 million $m^3$ volume of water that was potentially available for usage in Qatar in 2011. The agriculture sector is the primary user of TSE in Qatar, Almost 42 million $m^3$ of TSE (equivalent to 39% of TSE production in 2011) were used to meet agricultural sector's total water demand of the 270 million $m^3$. TSE generation further increased to 117 million $m^3$ in 2012 (FIG. 4) where nearly two third were reuse for agriculture and landscaping.

Apart from supplementing the huge water demand of the agriculture and irrigation sectors, TSE is expected to play a prominent role in Qatar's district cooling industries. It is estimated that these industries will consume nearly 73 million $m^3$ of TSE which represents 17% of total TSE demand in 2020. As per the approved directive of Water Resources Committee (PWRC) in 2014, usage of potable water for cooling purposes is forbidden in Qatar. As TSE is an excellent alternative to potable water, nearly 39 million $m^3$; per year of potable water can be saved by the district cooling industries in 2023. Other possible usage of TSF in Qatar are for the following applications: (i) make-up water for fire-fighting training exercise, (ii) non-potable use in construction field (e.g. concrete mixing) and road works, (iii) sanitary flushing, and (iv) sand washing.

Besides TSE, industrial wastewater is also being widely treated and reused in Qatar. Qatar's Ministry of Environment issued a directive that requires energy and industry sectors in Qatar to work towards Zero Liquid Discharge (ZED) of process wastewater by December 2016. In 2013, these sectors recycled 24.5 million $m^3$ of water.

Qatar Fertilizer Company (QAFCO) laid out plans to reuse 90% of its process wastewater irrigation or other purposes. Qatar Gas, the world's largest liquefied natural gas company, embarked on various engineering projects to increase its wastewater recycle rate to 70%. Qatar Fuel (WOQOD), a downstream oil storage, distribution, and marketing company, reduced the water consumption in its automatic car washing units by recycling 90% of the water used for cleaning. By end of 2014, Qatar Steel quadrupled the recycle rate of its blow-down water compared to the reported figure of 28,665 $m^3$ in 2012. Qatar Fuel Additives Company (QAFAC) managed to reduce its water consumption by 22% in 2014 by recovering and reusing 125,615 $m^3$ of water from its flue gas, and QAFAC has reused 47% of its recycled sanitary wastewater for irrigation purposes. Qatar Chemical Company has also achieved significant progress in recycling its wastewater where the reuse amount has increased from 16,144 $in^3$ in 2010 to 283,110 in 2013. ORYX GTL, one of the gas-to-liquid technology operators in Qatar, has reused 80% (approximately 1.38 million $m^3$) of its treated industrial water in 2012 for landscaping irrigation, cooling tower make-up and fire extinction.

Grey water generated from daily usage of urban residents and industrial water discards are the primary sources for treated wastewater. These wastewater resources can be effectively used for many useful urban, agriculture and industrial applications as long as they are treated adequately. In the MENA region, treated wastewater is primarily used for irrigation and landscaping.

Apart from supplementing the ever-lasting water demand of various sectors, treated wastewater offers several benefits. TSE offers a cheaper and lower water production cost compared to desalination. It has been reported that reuse wastewater is priced at $0.784/$m^3$ which represents only one-fourth of desalinated water cost. Another report claimed that savings close to three-fold can be realized when highly treated wastewater is utilized instead of desalinated water.

TSE also offers a lower energy requirement for production of treated wastewater. Energy required to desalinate water is also much higher than treating wastewater. Pearce reported that energy required to treat wastewater using conventional activated sludge system post treated with MF/UF and RO is in the region of 0.8-1.2 kWh/$m^3$ while energy required to desalinated seawater could be around 4 kWh/$m^3$.

TSE offers better utilization and management of water resources. Due to high production cost and energy requirement, desalinated water can be exclusively reserved for potable and other high-end usages. For instance, TSE can also be effectively used for landscaping and recreational irrigation purposes where significant savings can be achieved by reducing the purchase of potable water or the use of desalinated water.

TSE promotes soil enrichment when used for agriculture. Due to the possible presence of essential macro-micro nutrients such as nitrogen, phosphorus, potassium, iron, manganese, zinc, and copper, etc. in TSE, it can play a pivotal role in agricultural sector by improving the soil condition, biological health of the plants and reducing the usage of fertilizers. Usage of lesser fertilizers also minimizes environmental problems associated with chemical run-off.

Disposal of TSF, is less harmful to the environment than wastewater disposal, handling, and discharge. Environmental problems from discharge of wastewater into oceans and rivers include algal bloom and depletion of dissolved oxygen.

Discharge from wastewater treatment plants is an important source of contaminants to surface waters, and wastewater treatment facilities are giant collectors of the output of many human activities. From the analysis of environmental exposures, high concentrations of many chemicals of emerging concern were in the vicinity of sources such as wastewater treatment discharges.

Wastewater discharged by domestic, commercial, agricultural, and industrial sectors contains a myriad of pollutants, such as toxic compounds (e.g. pesticides, polychlorinated biphenyls, solvents), pathogens (e.g. bacteria, protozoa and virus), heavy metals (e.g. lead, mercury, arsenic, cadmium), nutrients (e.g. phosphorus and nitrogen), and chemicals of emerging concerns (pharmaceuticals, personal care products and endocrine disrupting chemicals). These pollutants pose significant threats to living organisms and environment. Wastewater effluent contains a wide range of pathogens and other pollutants including chemicals of emerging concern and heavy metals.

Figure 5:
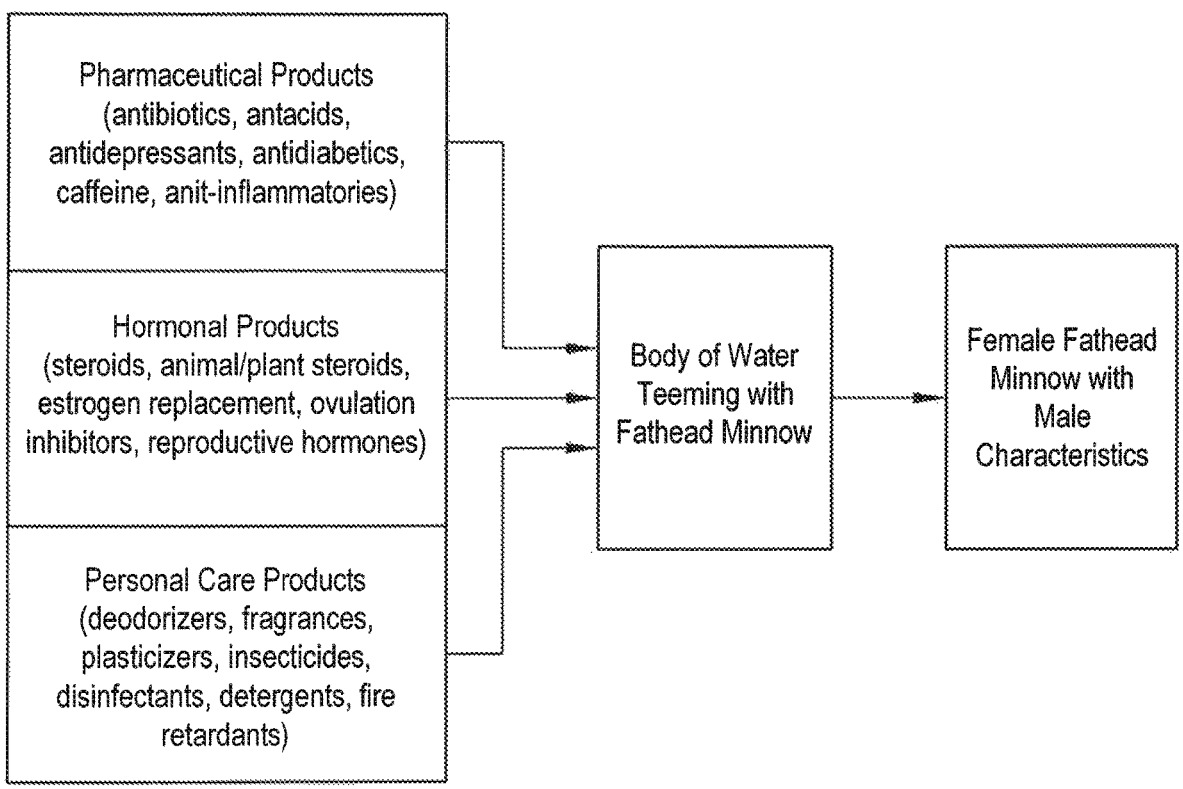
FIG. 5 shows EDCs and PPCPs according to the Pan American Group International Ozone Association.

Many studies have confirmed the abundant presence of pharmaceuticals and personal care products (PPCPs) and endocrine disrupting chemicals (EDCs) in wastewater that could pose a severe threat to public health. EDCs are naturally or synthetic substances that interfere with the functioning of hormone systems. These compounds have been detected in the environment (water, sediment, and wildlife) and drinking water, They are present in very low concentrations (parts per billion to parts per trillion). The impact on human health by EDCs is not fully understood, nor is the effect of the complex mixtures encountered, FIG. 5 shows some chemicals found to be EDCs and their effects in minnows.

As such, challenges associated with reuse of TSE include seasonal changes for treated sewage effluent, presence of certain organics and chemicals that might have an impact on the operation and equipment, pathogens in wastewater, heavy metals, chemicals of emerging concern (PPCPs and EDCs), and odor and color. Further, effluent wastewater from industrial and municipal wastewater facilities carries a broad and variable range of contaminants, including BOD, COD, color, phenols, cyanides, sanitary waste, and a host of complex chemicals.

Various treatment steps are usually employed in wastewater treatment plants to remove these contaminants prior to discharge or reuse. However, despite these treatment steps, many studies have highlighted the presence of the pollutants at various concentrations in treated wastewater, thus raising several concerns related to the usage of this alternative water resource. As such, there is a critical need to evaluate the efficacy of applying certain advanced technologies to improve the quality of TSE for reuse in more applications in the industrial and agricultural sectors to reduce the demand on desalinated water.

TSE promotes soil enrichment when used for agriculture. Due to the possible presence of essential macro-micro nutrients, such as nitrogen, phosphorous, potassium, iron, manganese, zinc, and copper, the TSE can play a pivotal role in the agricultural sector by improving the soil condition, biological health of the plants, and reducing the usage of fertilizers. Usage of lesser fertilizers also minimizes environmental problems associated with chemical run-off.

Above all, public health is the most crucial issue that needs to be seriously and carefully addressed in all the reuse applications of treated wastewater. Nearly one in every five children who are younger than 5 years old succumb to death every year due to water related diseases.

Presence of pathogens and chemicals of emerging concern in treated wastewater are the two pollutants that pose significant threat to the public health. The public could be exposed to these pollutants due to direct contact with the polluted treated water (e.g. people who are working or handling treated water (e.g. farmers and workers) or residents who are staying nearby and using polluted water sources. Possible routes for direct contact are via oral ingestion, inhalation, and skin contact. Another potential exposure pathway is via indirect consumption of food products of agriculture crops and animals that are being bred using contaminated treated wastewater.

Many scientific studies have reported on the presence of bacteria, protozoa, helminth and virus in treated effluent. Health risk due to pathogen exposure is much greater and almost immediate in comparison to toxic chemicals, which are only found in trace amounts in treated water sources. Several studies on treated effluent quality of wastewater treatment plant reported on the constant detection of *Cryptosporidium parvum*, a pathogenic protozoon that is responsible for severe diarrheal illness in humans. Another diarrheal causing protozoon is Giardia, which is also commonly found in treated wastewater. Maliva et al. claimed that single exposure to *Cryptosporidium* can lead to severe health issues.

Although many advance wastewater treatment plants utilize chlorine to disinfect their effluents, there were many cases where chlorine were reported to be largely ineffective in disinfecting pathogen in water sources. Presence of chlorine resistant bacteria is one of the reasons for poor disinfection rate using chlorine. Li et al. observed significant regrowth of total coliforms and *Salmonella* after chlorinating reclaimed water. It was postulated that opportunistic pathogens such as *P. aeruginosa* and *S. aureus* could be more resistant to chlorine than enteric bacteria.

Zhaou et al. reported that additional disinfection could be needed prior to reuse of treated effluent that has been stored over a period of time. In their study, pathogens such as *E. Coli, Salmonella, Shigella*, and virus were detected in a lake where the initially disinfected treated water was stored for future usage. Legionella, dangerous waterborne bacteria that usually affects the lungs, has also been detected in treated grey water that was disinfected using chlorine. Another study reported that enteroviruses and noroviruses were found in both influent and effluent of the wastewater treatment plants. These facts highlight the shortfalls of treatment plants in adequately addressing the risk associated with pathogens.

Tonani et al. reported that although remarkable removal rate was achieved for *Cryptosporidium*, Giardia, Rotavirus and Adenovirus in the wastewater effluent, the breakthrough of the remaining pathogens can still be harmful for children. Similar findings were observed in a membrane bio-reactor (MBR) treated wastewater that was used for agricultural irrigation. Despite decrease in levels after MBR treatment, presence of pathogens such as *Aeromonas hydrophila, Arcobacter* spp., *Bacillus cereus, Clostridium difficile, Clostridium perfringens, E. coli, Legionella* spp. and *Mycobacterium* spp. presence cause a concern as a potential threat to public health. Another study that investigated the microbial removal in municipal wastewater treatment plant concluded that effluent of the plant contained low concentrations of nearly 75 genera pathogenic bacteria.

A WHO report in 2014 investigated the current degrees of surveillance and awareness of anti-microbial resistance (AMR) on a global scale, which represents and highlights a new challenge to preventing and treating raised levels of infections caused by bacteria, parasites, viruses and fungi. Various reports across the WHO regions showcase a high resistance level from bacteria, which cause infections within communities. This ultimately threatens the available health care systems. The most recent information gathered from the WHO is based on resistance surveillance and trends, With the recent trends in development and use of other antimicrobial agents, there may be an increase in parasitic, fungal and viral resistance, in which the aquatic environment is likely to play a role.

Furthermore, the World Health Organization (WHO) reported that resistance to antibiotics poses a "major global threat" to public health. A report by the WHO analyzed data from 114 countries and found resistance was happening now "in every region of the world". It described a "post-antibiotic era", where people die from simple infections that have been treatable for decades. For instance, urinary tract infections caused by *E. coli* bacteria are becoming increasingly harder to treat.

Figure 6:
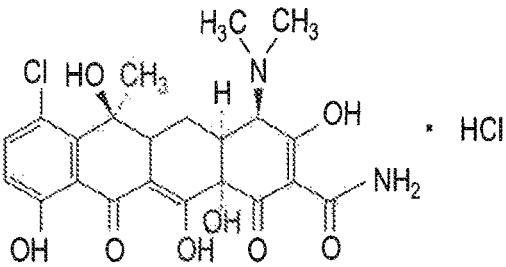
FIG. 6 shows antibiotics in TSE according to Sassman and Lee 2005; Chen and Lin 1998; and Tolls 2001.
Figure 6:
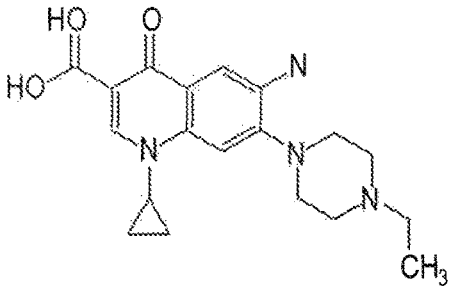

Antibiotics resistant bacteria is a serious problem associated with wastewater treatment and reuse. For instance, more than 2 million people in the United States suffer every year from severe infections as prescribed antibiotics failed to treat infections caused by bacteria that have developed strong resistances towards the medications. This has led to at least 23,000 deaths per year. Wastewater treatment plants and effluent have been identified as the breeding ground of antibiotic resistance bacteria. FIGS. 6 and 7 show antibiotics in TSE and target compounds in TSE. Combined presence of antibiotics (originating from human/animal excretion, hospital waste and agriculture run-offs) and huge spectrum of bacteria in wastewater treatment plants enable the bacterial community to swap genes that resist antibiotics and eventually turning into superbugs.

In general, microorganism concentrations in wastewater effluent are lower than influent due to disinfection process in treatment plants. Nevertheless, it would be impossible to completely eradicate them using conventional disinfection methods. Despite lower concentration, bacteria in the wastewater effluent could be several folds stronger in resisting antibiotics. Al-Jassim et al. showed chlorinated effluent from a wastewater plant has increased the antibiotic resistance of *Enterococcus* spp. and *Enterobacter* spp. Another study that investigated antibiotic resistance of *Acinetobacter*, a pneumonia causing bacteria, proved that *Acinetobacter* resistance to amoxicillin/clavulanic acid (AMC), chloramphenicol (CM), and rifampin (RA) in the wastewater effluent has increased tremendously.

There have been varying levels of pharmaceuticals, PPCPs and EDCs reported in the water cycle over the last 10 years. The water cycle also includes surface water, wastewater, groundwater, and drinking water. Increased levels of detection are due to advances in analytical technologies. Research has shown that raw sewage and effluent from wastewater sources are significant contributors to the pharmaceuticals found in drinking water. It is therefore a priority to investigate the effectiveness of the available technologies to mitigate and remove them during treatment. Of concern is the uncertainty of potential adverse effects on wildlife and humans due to chronic exposure to low concentrations of these compounds. Some of these chemicals are accumulating in sediments, birds, fish, and other aquatic life, as well as in humans. Effective removal of the wide variety of chemicals of emerging concern is dependent on both the nature of the substance and the design and operation of the wastewater treatment plant and the available technological advances.

PPCPs are found in a wide range of chemicals utilized in daily life products such as shampoo, cosmetics, lotions, medicines (antiepileptic drugs, beta-blockers, blood lipid regulators, cytostatic drugs, oral contraceptives, and antiseptics, etc.), surfactants and many more. These compounds are released into the municipal sewer system via human waste excretion, bathing and direct/indirect disposal of medicine and chemicals. These dangerous compounds have been related to many human health issues such as hormonal cancers (e.g. breast, endometrial, ovarian, prostate, testis, and thyroid cancers), neurodevelopmental problems in children, reproduction system disorders, declination of sex ratio and adrenal system disorders. Esplugas et al. summarized that EDCs presence in water sources leads to feminization of male fish as well as affecting the reproduction of animals which could eventually lead to population deterioration. One of the common pathways for PPCPs and EDCs to exist in natural water bodies is via treated effluent as conventional wastewater treatment plants are inefficient in removing these compounds.

Investigation on the removal of PPCPs from three wastewater treatment plants in Xiamen, China by Sun et al. revealed that ketoprofen, diclofenac, mefenamic, crotamiton, ofloxacin, indomethacine, metoprolol, carbamazepine, triclocarban, and triclosan were poorly removed by these plants. Another study that investigated eight wastewater treatment plants in Greece revealed the existence of 18 PPCPs in the effluent which ranges from 6.6-1076.0 ng/L. Moderate to poor, or even negative removal of Carbamazepine, diclofenac, and budesonide were observed in their findings. A review by Mang et al. on the removal of carbamazepine and diclofenac by wastewater treatment plants is mostly below 10% and 40% respectively.

Water quality analyses of five wastewater treatment plants in Ulsan, South Korea by Behera et al. showed removal efficiency of lower than 30% for sulfamethazine, metoprolol, and carbamazepine. Poor removal efficiency of carbamazepine, diclofenac, atenolol, azythromycin and erythromycin were also reported by Rodriguez-Mozaz et. al. Characterization of biologically treated water samples from a municipal wastewater treatment plant by Kim et al. indicated the presence of 41 pharmaceuticals compounds such as analgesics, antiarrhythmic agents, antibiotics and etc. Alidina et al. who studied effluents from four different wastewater treatment plants in Saudi Arabia revealed the presence of PPCPs and chemicals that are commonly detected in the United States and Europe.

It is an undeniable fact that reuse of treated effluent from urban, agriculture, and industrial sectors will play a major role in meeting the overall water demand especially in MENA countries. Treated wastewater has been recognized as the only definite water resource that would increase with population growth. Nevertheless, the reuse potential in MENA countries is still relatively low due to various risks associated with conventionally treated wastewater. Health risks due to presence of pathogens, chemicals of emerging concerns, heavy metals, and other compounds in treated wastewater is one of the primary limiting factors that hamper its reuse potential.

Figure 8:
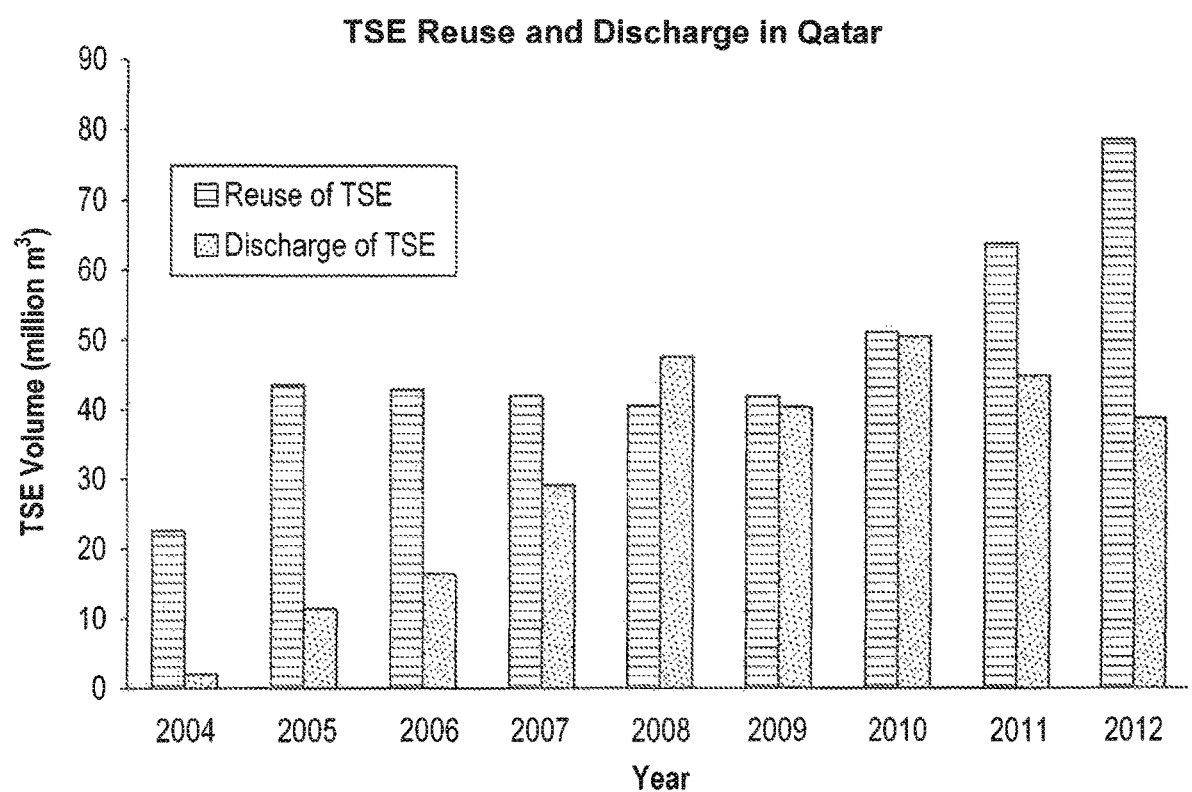
FIG. 8 shows TSE Reuse and Discharge in Qatar.

Further, wastewater that is in adequately treated can also have detrimental effects on soil. Discharge of excessive nitrogen from inefficient use of fertilizers and from human/animal waste has caused many environmental issues. Loss of aqua biodiversity due to eutrophication and ground water pollution by nitrate are some of the concerned environmental problems caused by nitrogen imbalance. Excessive nutrients in treated wastewater that is used for agriculture irrigation could lower the hydraulic conductivity of the soil and promote biofilm which eventually clogs the pore spaces between soil particles. Accumulation of heavy metals, pathogen, sodium, and nutrients on soil and plants are also other concerns related to TSE usage for agricultural purposes. Perceptions of end users and religious belief also play a role in potable reuse of TSE. Low utilization of treated wastewater is also largely attributed to lack of proper facilities, infrastructures, storage and pipe networks that could efficiently distribute treated effluent to the end users. FIG. 8 shows the TSE reuse and discharge volume in Qatar from 2004-2012. In 2012, 38.6 million m$^3$ of treated sewage effluent, which represented nearly 33% of the total TSE generated, were unused and eventually dumped to lagoons, sea and aquifer. Aquifer recharge using TSE was categorized as a loss because it could have been directly reused for agriculture irrigation if there were proper infrastructures available for TSE storage and distribution.

Reuse of treated wastewater has ample merits that are definitely worth exploring. However, problems associated with its implementation must be solved in order to reap the maximum benefits. This requires careful planning, proper water quality monitoring and guidelines, efficient water treatment technologies, research and development and approved legislation and laws to minimize any potential threat to public health and environment.

Thus, a system and method for oxidation of treated sewage effluent solving the aforementioned problems is desired.

Ozone and ozone based AOPs (advanced oxidation processes) provide an attractive solution to deal with pathogens and chemicals of emerging concerns in water bodies. Studies have highlighted that conventional wastewater treatment plants that rely on primary and biological treatments as well as chlorination are ineffective in removing these pollutants. Chlorination leads to formation of chlorinated disinfectant by-products (DBPs), such as trihalomethanes (THMs) and halogenic acetic acids (HAAs), which are carcinogenic to human beings.

Alternative oxidants such as ozone and ozone-hydrogen peroxide AOP are one of the competent solutions that could considerably reduce the threat posed by pathogens and chemicals of emerging concerns in treated wastewater. Rice et al. summarized that absorbed ozone dosage around 4 to 8 mg/L is required to disinfect filtered-biologically treated domestic wastewaters to below 200 fecal coliforms/100 mL. Another study concluded that ozone dosage of 17 mg/L would achieve 3-log reduction of MS-2, a single stranded RNA virus that infects E. coli. Pharmaceutical substances such as chlorotetracycline, enrofloxacin, and gemfibrozil that were found in a secondary municipal wastewater effluent were successfully degraded by more than 76% when 0.33 mg $O_3$/mg DOC was applied. Snyder et al. achieved a removal rate of more than 80% for 15 out 17 target pharmaceutical/EDC compounds at an ozone dosage of 8.7 mg/L.

Although ozone has been proven effective in degrading many pollutants, some of the compounds are recalcitrant to it. Superior degradation of organic pollutants can be achieved using highly reactive hydroxyl radicals that are generated using an advance oxidation process, Combination of ozone and hydrogen peroxide is commonly used to generate hydroxyl radicals. Sato et al. reported that their AOP process (ozone dose of 6 mg/L, and $H_2O_2/O_3$ mole ratio of 0.5) was effective in reducing 29 out 37 PPCPs and EDCs below the detection limit. Lin et al. reported that addition of hydrogen peroxide in ozonated water accelerated the degradation of several antibiotics (Sulfamethoxazole, Sulfadimethoxine, Sulfamethazine, Erythromycin, and Tylosin). Snyder et al. recommended that AOP could be used when sufficient contact time is not available for ozone-only process due to higher degradation kinetics of AOP.

Ozone, in combination with other physical, chemical, or biological processes, has the potential to treat complex industrial wastes due to its strong oxidative nature. Ozone exhibits the power of advanced oxidation for total organic carbon (TOC) reduction, as well as destruction of organics. Potential industries that can benefit from ozone treatment include district cooling, pharmaceuticals, textiles, automotive, and foundry, among others. The table below shows advantages of ozone treatment for drinking water and wastewater.

| Advantages of Ozone | | |
| --- | --- | --- |
| Parameter | Drinking Water | Wastewater |
| Powerful disinfectant | X | X |
| Removes PPCPs and EDCs | X | X |
| Taste and odor control | X | |
| Improve treatment process | X | |
| Reduces trihalomethanes | X | |
| Elevates dissolves oxygen | | X |
| Decomposes back to oxygen | | X |

Figure 9:
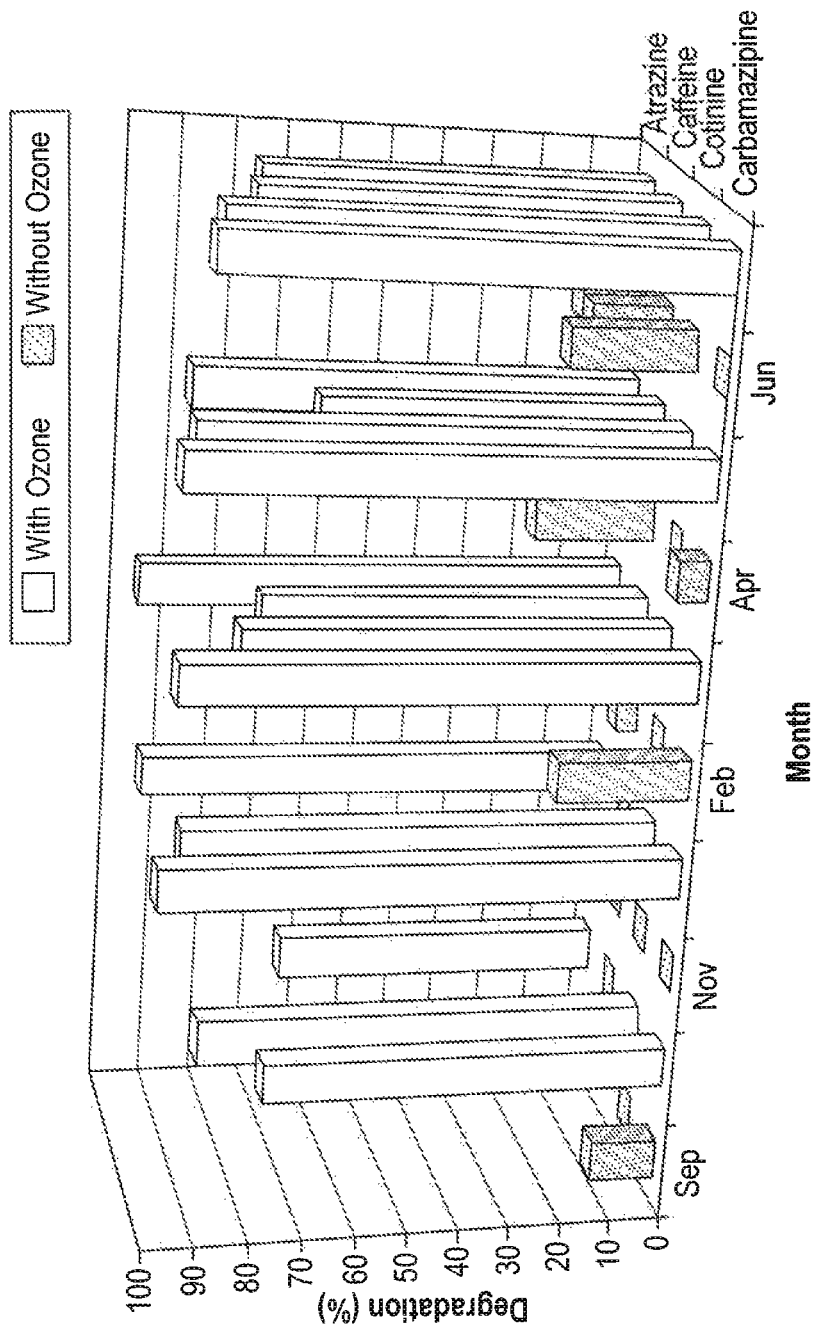
FIG. 9 shows percent degradation of compounds suing ozone versus conventional treatment according to the Detroit River Study, Jasim et al., 2006.

FIG. 9 shows percent degradation of compounds using ozone versus conventional treatment. An ozone based AOP involves the oxidation of target contaminants by OH radicals. $H_2O_2$ starts the breakdown of ozone, which then produces OH radicals via complex reaction mechanisms in an ozone/$H_2O_2$-based advanced oxidation process. This procedure eliminates organics that are resistant to ozone. Increasing reaction time post ozone addition can further enhance AOPs. Benefits include no production of sludge and no transfer of pollutants.

It is to be understood that the present subject matter is not limited to the embodiments described above, but encompasses any and all embodiments within the scope of the following claims.

We claim:

1. A method for post-treatment of treated sewage effluent, consisting of the steps of:
    exposing treated sewage effluent to ozone and hydrogen peroxide to oxidize contaminants therein to provide a first decontaminated treated sewage effluent;
    removing suspended particles from the first decontaminated treated sewage effluent, wherein the removal of particles consists of the steps of:
        coagulating remaining waste in the treated sewage effluent,
        flocculating the coagulated treated sewage effluent,
        holding the flocculated treated sewage effluent in a settling tank for sedimentation to occur, wherein the sedimentation occurs for at least 30 minutes,
        removing coarse suspended particles from the flocculated treated sewage effluent by a first filtration after sedimentation to provide a first filtered sewage effluent; and
    removing fine suspended particles from the first filtered treated sewage effluent by a ceramic or polymer ultrafiltration to provide a second filtered treated sewage effluent.

2. A system for post-treatment of treated sewage effluent, the system consists of:
    (a) a preparation tank for receiving treated sewage effluent;
    (b) an ozone injection system for adding ozone to an ozone contactor;
    (c) a hydrogen peroxide dosing pump for adding hydrogen peroxide to the ozone contactor;
    (d) a rapid mixer for coagulating the ozone-hydrogen peroxide treated sewage effluent;
    (e) a flocculation tank for flocculating coagulated treated sewage effluent;
    (f) a sedimentation tank for settling suspended particles from the flocculated treated sewage effluent;
    (g) a sand filter for filtering the settled suspended particles;
    (h) a ceramic or polymer ultrafiltration system for ultrafiltration of the filtered treated sewage effluent;
    (i) an advanced oxidation process system for administration of a second treatment of ozone and hydrogen peroxide;
    a system of conduits connecting (a) through (i).

* * * * *